(12) United States Patent
Chen

(10) Patent No.: US 9,848,235 B1
(45) Date of Patent: Dec. 19, 2017

(54) VIDEO FINGERPRINTING BASED ON FOURIER TRANSFORM OF HISTOGRAM

(71) Applicant: Sorenson Media, Inc., Draper, UT (US)

(72) Inventor: Juikun Chen, West Jordan, UT (US)

(73) Assignee: Sorenson Media, Inc, Draper, UT (US)

(*) Notice: Subject to any disclaimer, the term of this patent is extended or adjusted under 35 U.S.C. 154(b) by 0 days.

(21) Appl. No.: 15/098,135

(22) Filed: Apr. 13, 2016

Related U.S. Application Data

(60) Provisional application No. 62/298,376, filed on Feb. 22, 2016.

(51) Int. Cl.
*H04N 7/173* (2011.01)
*H04N 21/4402* (2011.01)
(Continued)

(52) U.S. Cl.
CPC ... *H04N 21/440245* (2013.01); *H04N 21/222* (2013.01); *H04N 21/23424* (2013.01); *H04N 21/2407* (2013.01); *H04N 21/26258* (2013.01); *H04N 21/435* (2013.01); *H04N 21/437* (2013.01); *H04N 21/44008* (2013.01); *H04N 21/812* (2013.01); *H04N 21/84* (2013.01)

(58) Field of Classification Search
CPC ....... H04N 21/23418; H04N 21/44008; H04N 21/251; H04N 21/44209; H04N 21/44213; H04N 21/44222; H04N 21/4532; H04N 21/458; H04N 21/466; H04N 21/4661; H04N 21/4662; H04N 21/4663; H04N 21/4665; H04N 21/4666; H04N 21/4667; H04N 21/4668; H04N 21/26291; H04N 21/4316; H04N 21/4722; H04N 21/4725; H04N 21/4728

USPC ...................................................... 725/19, 20
See application file for complete search history.

(56) References Cited

U.S. PATENT DOCUMENTS 6,058,211 A * 5/2000 Bormans ............... H04N 19/46
375/E7.077
8,150,096 B2 4/2012 Alattar
(Continued)

OTHER PUBLICATIONS

Bhogle, Mrunalini P., et al., "Content Based Copy Detection Using TIRI-DCT Method," International Journal of Engineering Sciences & Research Technology, pp. 449-454 (Jul. 2014).

(Continued)

*Primary Examiner* — Junior Mendoza
(74) *Attorney, Agent, or Firm* — Honigman Miller Schwartz and Cohn LLP

(57) ABSTRACT

A content device and method is disclosed to include a processing device to process streaming video content. A fingerprinter receives captured frames of the streaming video content and, for each frame of a plurality of the captured frames, generates a one-dimensional histogram function of pixel values and transforms the histogram function with a Fast Fourier Transform (FFT), to generate a plurality of complex values for the frame. The fingerprinter further, for each of the plurality of complex values, assigns a binary one ("1") when a real part of the complex value is greater than zero ("0") and assigns a binary zero ("0") when the real part is less than or equal to zero, to generate a plurality of bits. The fingerprinter further concatenates a specific number of the bits to generate a fingerprint for the frame.

17 Claims, 7 Drawing Sheets

(51) Int. Cl.
*H04N 21/44* (2011.01)
*H04N 21/435* (2011.01)
*H04N 21/437* (2011.01)
*H04N 21/24* (2011.01)
*H04N 21/222* (2011.01)
*H04N 21/262* (2011.01)
*H04N 21/234* (2011.01)
*H04N 21/81* (2011.01)
*H04N 21/84* (2011.01)

(56) References Cited

U.S. PATENT DOCUMENTS

| | | | | |
|---|---|---|---|---|
| 9,516,377 | B1* | 12/2016 | Chen | H04N 21/44008 |
| 2002/0147751 | A1* | 10/2002 | Goel | G06F 7/552 |
| | | | | 708/201 |
| 2007/0094260 | A1* | 4/2007 | Murphy | G06F 21/51 |
| 2007/0143777 | A1* | 6/2007 | Wang | H04H 60/27 |
| | | | | 725/18 |
| 2011/0071838 | A1* | 3/2011 | Li-Chun Wang | G06F 17/30743 |
| | | | | 704/270 |
| 2011/0078729 | A1* | 3/2011 | LaJoie | G11B 27/28 |
| | | | | 725/36 |
| 2011/0098056 | A1* | 4/2011 | Rhoads | G01C 21/20 |
| | | | | 455/456.1 |
| 2011/0247042 | A1* | 10/2011 | Mallinson | G06F 17/30026 |
| | | | | 725/86 |
| 2012/0250988 | A1* | 10/2012 | Peng | G06T 5/40 |
| | | | | 382/165 |
| 2013/0205330 | A1* | 8/2013 | Sinha | G06T 1/0021 |
| | | | | 725/28 |
| 2014/0184852 | A1* | 7/2014 | Niemi | H04N 5/2356 |
| | | | | 348/239 |

OTHER PUBLICATIONS

Sarkar, Asindya et al., "Video Fingerprinting: Features for Duplicate and Similar Video Detection and Query-based Video Retrieval," Department of Electrical and Computer Engineering University of California, pp. 1-12 (2008).

* cited by examiner

VIDEO FINGERPRINTING BASED ON FOURIER TRANSFORM OF HISTOGRAM

CROSS-REFERENCE TO RELATED APPLICATION

This application claims the benefit of U.S. Provisional Application No. 62/298,376, filed Feb. 22, 2016, the entire disclosure of which is incorporated herein by this reference.

BACKGROUND

Media consumption devices, such as smartphones, tablets, and smart televisions (TVs), can access digital content and receive data, such as streaming media, from data networks (such as the Internet). Streaming media refers to a service in which media content can be provided to an end user (upon request) over a telephone line, a cable, the Internet, and so forth. For example, a user can view a movie without having to leave their residence by requesting the movie via a media consumption device and viewing the movie as it is streamed over the Internet. In another example, users can access various types of educational content, such as video lectures, without having to physically attend a school or educational institution.

As the number of media consumption devices continues to increase, media content generation and delivery can similarly increase. With an increase in use of media consuming devices to access streaming media, content or network providers can distribute contextually-relevant material to viewers that are consuming streaming media. For example, local broadcasters can integrate contextually-relevant advertisements and interactive content with streaming media.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DESCRIPTION OF EMBODIMENTS

Figure 1A:
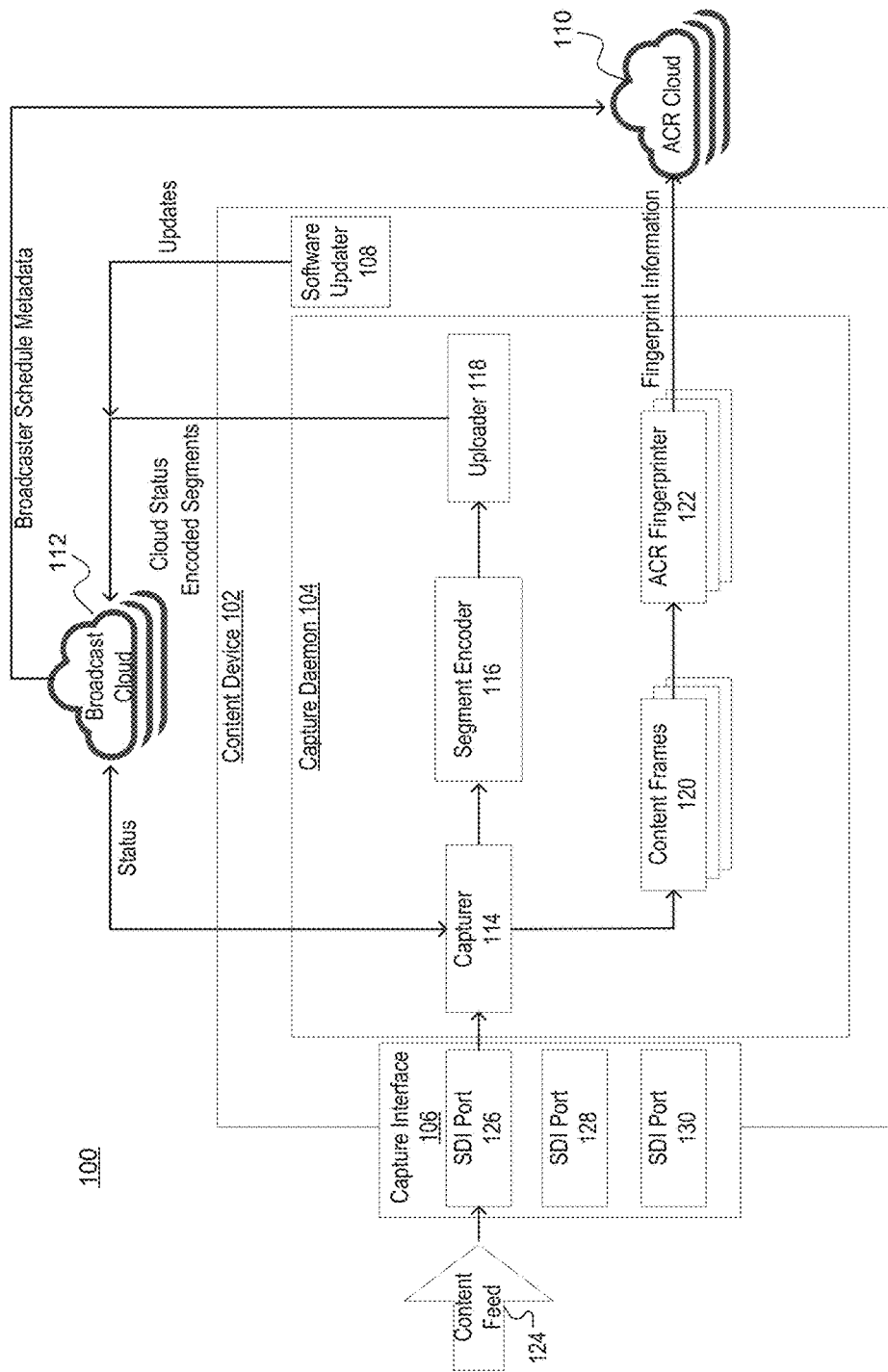
FIG. 1A illustrates a content preparation system to prepare media content according to one embodiment.

Fingerprinting of video content has been employed in automatic content recognition to determine what streaming media is being watched on a consumption device so that the contextually-relevant advertisements and interactive content can be incorporated within the streaming media and at the correct time.

In one embodiment, a content device and method is disclosed to include a processing device to process streaming video content. A fingerprinter receives captured frames of the streaming video content and, for each frame of a plurality of the captured frames, generates a one-dimensional histogram function of pixel values and transforms the histogram function with a Fast Fourier Transform (FFT), to generate a plurality of complex values for the frame. The fingerprinter further, for each of the plurality of complex values, assigns a binary one ("1") when a real part of the complex value is greater than zero ("0") and assigns a binary zero ("0") when the real part is less than or equal to zero, to generate a plurality of bits. The fingerprinter further concatenates a specific number of the bits to generate a fingerprint for the frame. This fingerprint can be compared with another fingerprint to confirm identify of the streaming video content. Furthermore, a second fingerprint can be generated by concatenating a plurality of frame fingerprints, e.g., every frame fingerprint from the streaming video content or every other frame fingerprint or the like.

The fingerprint generated in this way exhibits a number of favorable characteristics, including that neighboring frames of a video exhibit similar fingerprint signatures. Accordingly, the concatenation can take every other frame, for example, to generate a fingerprint of sufficient strength to positively recognize a video stream. Similarly, frames that are apart exhibit quite different fingerprints. In this way, fingerprint matching is more likely to produce accurate results, rather than any false negatives or false positives. The present method is also computationally less intensive than other fingerprinting algorithms because the FFT is applied to the histogram of a frame.

To provide viewers with media content that contain different fingerprints or fingerprint signatures, a media content provider can stream the media content to viewers, such as by delivering the media content over the Internet to the viewers. The media content provider can be an individual or an organization such as a local broadcaster, a multi-channel network provider, or another content owner or distributor. The media content can be content (such as video data) originating from one or more live broadcast media feeds. For example, a media content provider can provide a user media content via a linear media channel (e.g. media provided from a live media feed source to a viewer) over the Internet.

The word "content" can be used to refer to media or multimedia. The word "content" can also be a specific term that means the subject matter of the medium rather than the medium itself. Likewise, the word "media" and some compound words that include "media" (e.g. multimedia, hypermedia) are instead referring to content, rather than to the channel through which the information is delivered to the end user or audience. An example of a type of content commonly referred to as a type of media is a "motion picture" referred to as "a film."

Streaming media can be media content that is received by and presented to an end-user from a content provider over a network. Streaming media can be a playback or live media that can be played on media consumption devices. When media is played back on the media consumption devices, the media content can be stored on a server for a period of time and then sent to the media consumption devices over the network upon request, e.g., a video on demand (VOD) service. Live streaming can be the streaming of a live or real-time event, such as a news event or sports event, to the media consumption devices as the event is occurring.

Streaming or transferring media content to media consumption devices over networks can include encoding data (such as video and/or audio data) and/or the transmission of the data over networks. In one example, data can be encoded to provide a secure transfer of data between a provider and a media consumption device. In another example, data can be encoded or converted to adjust for varying display sizes, processing capabilities, network conditions, and/or battery capabilities of the media consumption device. The content generation, processing, encoding, and/or distribution can be performed by a provider (such as at a server) and processing, decoding, and/or content displaying can be performed at the media consumption devices.

Additionally, while advertising can be an engaging venue to advertise products or services, traditional media consumption advertising lacks targeted and personalized advertising. Traditional media consumption advertising also lacks a return path for users to engage with an advertisement and/or enable retargeting of the users once an advertisement has been viewed by the users. To increase an impact and effectiveness of the advertisement, an advertiser can be interested in targeting particular advertisements to particular sets of viewers, such as a viewer of a selected demographic or location. The advertiser can be interested in interacting with the targeted viewer when the targeted viewer sees the targeted advertisement. For example, a content provider can generate a content feed advertisement link to the media content that is relevant to a particular media item. Where consumers of the media items generally tend to select media items that are interesting to them, linking advertisements to media content can enable advertisers to direct their advertisements to consumers who are interested in a particular topic. Media consumption devices with automatic content recognition (ACR) devices or media consumption devices that receive content with contextually-relevant material can provide viewers with targeted and/or personalized advertising as well as an interactive viewing experience.

In another embodiment, an ACR device can identify audio and/or video content using content fingerprinting. Content fingerprinting can be a processing device that identifies, extracts, and compresses fingerprint components of a media content to uniquely identify the media content by its fingerprint. In one example, fingerprint components can be visual video features such as key frame analysis, colors, and motion changes during a video sequence. The ACR device can identify the video content as the video content can be displayed on a media consumption device by matching a sequence of content fingerprints for the video content being displayed with a database of content fingerprints. An advantage of content fingerprinting can be to process the media content while media content is being broadcasted or streamed (e.g., live processing) or within a selected threshold period of time after the media content is broadcast or streamed (e.g., substantially live processing). As the ACR device processes the media content, the ACR device can adjust for user behavior while the user views the media content (e.g., live or substantially live adjusting). In one example, the user behavior can be changing or pausing a channel, adjusting a volume of the media consumption device, changing menu settings, and so forth. In another example, the user behavior can be viewing time-shifted content.

For live streaming, multiple devices and/or complex infrastructure can be used to provide a content feed with the contextually-relevant material. For example, traditionally, media content can be encoded by an encoder before providing the media content to a media consumption device. A provider, such as a broadcaster, that provides media content to a viewer can desire to distribute contextually-relevant material (including advertisements and interactive content) to viewers. Traditionally, when the provider requests that the media content include contextually-relevant material, the encoder can provide the media content to a fingerprinter. The fingerprinter can insert contextually-relevant material into the encoded media content and the media content can be provided to the viewer with contextually-relevant material.

As multiple devices are used for the preparation and delivery of media content with contextually-relevant material, infrastructure complexity, resource support, and system setup time and complexity can increase. For example, traditionally, ACR service vendors can provide a broadcaster with ACR fingerprinting services and/or a device that performs ACR fingerprinting. Similarly, content encoding and uploading service vendors can provide encoding and uploading services to deliver video streams over the Internet. For example, content encoding and uploading service vendors can provide devices or software for installation on applications that perform content stream preparation and delivery.

As disclosed, an ACR device can simultaneously fingerprint media content and encode and upload the media content to a server, such as a cloud server, to provide the media content to the media consumption device. The media content can provide a viewer of the media consumption device with encoded media content including contextually-relevant material. In one embodiment, the linear channel can be created using a cloud computing system.

FIG. 1A illustrates a content preparation system 100 to prepare media content according to one embodiment. The content preparation system 100 can include a content device 102 (such as a client or other media consumption device), an ACR cloud(s) or server(s) 110, and a broadcast server or cloud(s) 112. The ACR cloud(s) 110 and/or the broadcast cloud(s) 112 can be cloud-based servers. The content device 102 can include a housing with a processing device disposed on a circuit board within the housing. The content device 102 can include a capture daemon 104, a capture interface 106 coupled to the processing device, and/or a software updater 108. The content device 102 can receive media content from a content feed 124 and prepare the media content to include contextually-relevant material that can be delivered to a media consumption device.

The content device 102 can receive the content feed 124 using a capture interface 106. The capture interface 106 can be used to capture and convert media content from the content feed 124. The media content can include audio content, video content, or a combination thereof. In one example, the content feed 124 is a high definition (HD) serial digital interface (SDI) stream. In another example, the content feed 124 is a standard definition (SD) SDI stream. In one example, the capture interface 106 can receive a content feed using a data port. In one example, the data port can be a coaxial cable port, such as a Bayonet Neill-Concelman (BNC) port. In another example, the data port can be a high definition multimedia interface (HDMI) port. In another example, the capture interface 106 is a capture card. In this example, the capture card includes the data port that is an internet protocol (IP) network interface. The IP network interface can be an Ethernet RJ45 port that receives the media content contained in an MPEG-2 Transport Stream. In another example, the content device 102 is processing logic that executes as a process on a remote server and receives media content via a software application programming interface (API). The processing logic can include hardware (e.g., circuitry, dedicated logic, programmable logic, microcode, etc.), software (e.g., instructions executed by a processing device), firmware or a combination thereof. The disclosed methods can be performed by processing logic of the content preparation system 100.

The capture interface 106 can include serial digital interface (SDI) ports, e.g., SDI In/Out ports. The SDI ports can be configured to receive content (e.g., an input port configuration) or send content (e.g., an output port configuration). The capture interface 106 can receive one or more content feeds using the SDI ports 126, 128 and 130. When the capture interface 106 receives multiple content feeds 124, each content feed 124 can be fingerprinted, encoded, and/or uploaded, as discussed in the proceeding paragraphs. For example, the capture interface 106 can receive two content feeds using SDI port 126 and SDI port 128. In this example, the capture daemon 104 can process the content feeds 124 in parallel.

When the capture interface 106 receives content from the content feed 124, the capture interface 106 can send the content feed 124 to a capturer 114. The capturer 114 can be software, firmware, or hardware that can control and/or interact with the capture interface 106. In one example, the capturer 114 instructs the capture interface 106 to use one or more of the SDI ports 126, 128 and 130 as an input port or output port. In another example, the capturer 114 instructs the capture interface 106 how to obtain incoming media content, such as audio/video data, based on capture criteria. In one example, the capturer 114 communicates with the capturer interface 106 to determine when media content is received from the content feed 124. In this example, when media content is received, the capturer 114 analyzes the media content to determine feed properties. In one example, the feed properties are an audio format and a video format of the media content. In another example, the feed properties are bitrates of the audio and video content of the media content. The capturer 114 can use the capture interface 106 to obtain advanced media content information and perform advanced functions, such as: closed caption information; time codes delivered within the feed; and adjust media content data, such as color space conversion and/or scaling.

When the capturer 114 receives the media content from the capture interface 106, the capturer 114 can provide the media content to both the fingerprinter 122 and to the segment encoder 116. For example, the capturer 114 can provide audio/video data to both the fingerprinter 122 and the segment encoder 116 by splitting the audio/video data for delivery to the fingerprinter 122 and the segment encoder 116. In one example, the capturer 114 can communicate with the broadcast server or cloud(s) 112 to indicate when media content is being received via the capture interface 106 for uploading to the broadcast cloud(s) 112, e.g., a streaming status. In another example, the capturer 114 can receive a status message from the broadcast cloud(s) 112 indicating a status of the broadcast cloud(s) 112 to receive streaming content from the capture daemon 104, e.g., a receiving status. In one embodiment, the capture daemon 104 can communicate with the broadcast cloud(s) 112 using a polling method. In this embodiment, the capture daemon 104 can send a status message to notify the broadcast cloud(s) 112 of a streaming status of the capture daemon 104 (such as content ready for streaming status or no current content for streaming status) and/or retrieve a receiving status from the broadcast cloud(s) 112. In another example, the capturer 114 can provide system metric information to the broadcast cloud(s) 112, such as central processing unit (CPU) utilization, memory utilization, drive utilization, operating temperature, and so forth. In another example, the software updater 108 can be configured to update the content device 102. For example, the software updater 108 can use a polling method to communicate with the broadcast cloud(s) 112 to determine when an update has been scheduled, such as a time of day, and update the content device 102 at the scheduled time.

The segment encoder 116 can receive content from the capturer 114 and encode the content to provide secure content for a transferring of data between the broadcast cloud(s) 112 and the media consumption device. The segment encoder 116 can also encode or convert the data to adjust for varying display sizes, processing capabilities, network conditions, and/or battery capabilities of the media consumption device.

The segment encoder 116 can encode and write content segments to a disk or a memory of the segment encoder 116. When the content segments have been encoded, the segment encoder 116 can then communicate encoded content segments to the uploader 118. After the content is communicated to the uploader 118, the content segments can be deleted from the disk or the memory of the segment encoder 116. When the uploader 118 receives the encoded content segments, the uploader 118 can upload the encoded content segments to the broadcast cloud(s) 112. When the uploader 118 has uploaded the encoded content segments, the uploader 118 can notify the broadcast cloud(s) 112 that the encoded content segments have been encoded and can provide content metadata, such as a time the content was captured by the capture interface 106 and/or a duration of the content.

The broadcast cloud(s) 112 can process the uploaded encoded content segments before delivering the content segments for playback at a media consumption device. The processing by the broadcast cloud(s) 112 can include transcoding the content segments into multiple bit rates to support adaptive bit rate playback and uploading all resultant segments to a content delivery network (CDN).

In parallel with communicating the content to the segment encoder 116, the capturer 114 can generate content frames 120 and can communicate the content frames 120 to a fingerprinter 122. In one example, the content frames 120 can be audio data. In another example, the content frames 120 can be video content. In this example, video content can be raw video frames. When the fingerprinter 122 receives the content frames 120, the fingerprinter 122 can determine how to process and/or transform the content frames 120, such as the raw video frames.

In one example, the content frames 120 can be fingerprinted individually. In another example, the content frames 120 can be fingerprinted in collections or sequences. The fingerprinter 122 can determine when to fingerprint the content frames 120 individually or sequentially based on an ACR algorithm used by the fingerprinter 122. In another example, the fingerprinter 122 can fingerprint the content frames 120 differently for different broadcasters or users. In this example, the fingerprinter 122 can include different ACR fingerprinting algorithms for different ACR vendors. In one embodiment, the different ACR fingerprinting algorithms can be predetermined and stored on a memory of the fingerprinter 122. In another embodiment, the different fingerprinting algorithms can be provided by third party ACR vendors.

When different fingerprinting algorithms can be provided by the third party ACR vendors, the fingerprinter 122 can aggregate the different fingerprinting algorithms. In one example, fingerprinting can use raw video with in the YUV 4:2:2 colorspace and at high resolutions. YUV is a color space typically used as part of a color image pipeline. YUV encodes a color image or video taking human perception into account, allowing reduced bandwidth for chrominance components, thereby typically enabling transmission errors or compression artifacts to be more efficiently masked by the human perception than using a direct red-green-blue (RGB)-representation. Other color spaces have similar properties, and the main reason to implement or investigate properties of Y'UV would be for interfacing with analog or digital television or photographic equipment that conforms to certain Y'UV standards.

When content feed 124 is received at the capture interface 106, the capturer 114 can convert the content feed 124 to a YUV 4:2:0 colorspace and scale it down in resolution to a threshold resolution level for encoding by the segment encoder 116. In another example, the fingerprinter 122 can determine information for a first media consumption device using a first ACR algorithm and determine ACR fingerprint information for a second media consumption device using a second ACR algorithm.

Figure 2:
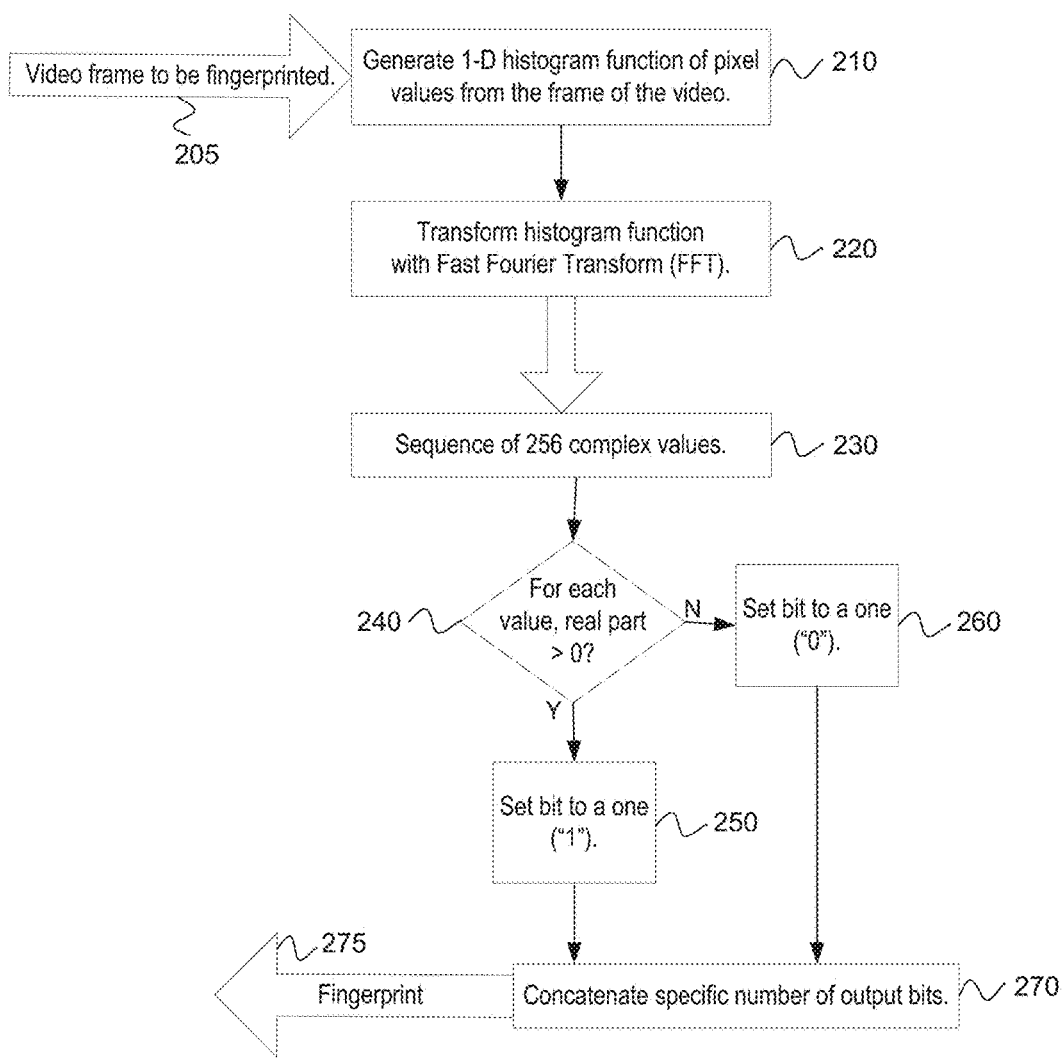
FIG. 2 illustrates a flowchart of an exemplary fingerprint algorithm executable by a video fingerprinter.

With reference to FIG. 2, a method 200 can be at least partially performed by processing logic of the content device 102 that can include hardware (e.g., circuitry, dedicated logic, programmable logic, microcode, etc.), software (e.g., instructions executed by a processing device), firmware or a combination thereof. The processing logic of the content device 102 can include the one or more fingerprinter 122.

Figure 3:
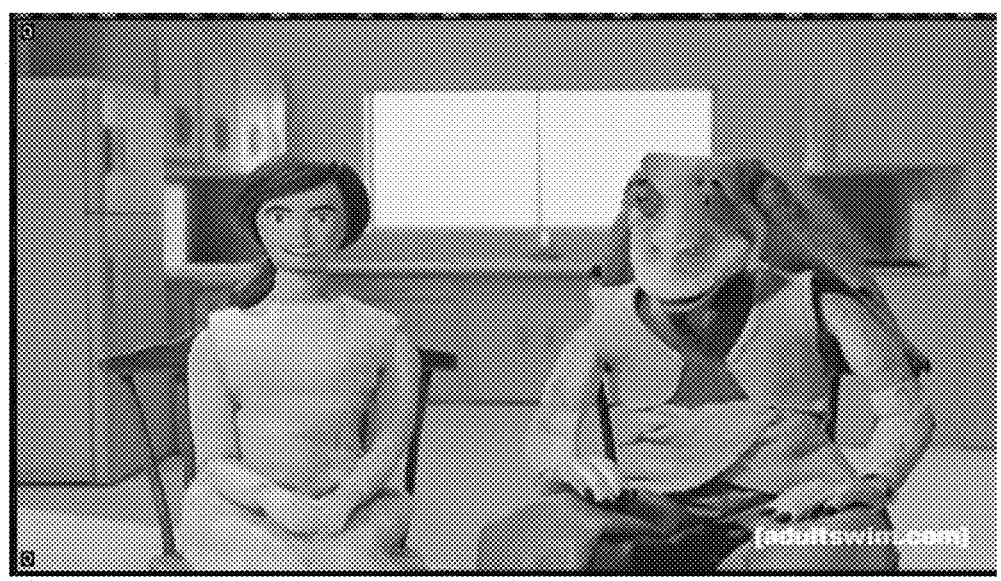
FIG. 3 is a photo of a frame of a video.

The fingerprinter 122 can receive a video frame to be fingerprinted (205), such as from a sequence of captured content frames 120 from the capturer 114. FIG. 3 is an example of a video frame. The fingerprinter 122 can then process the frame to generate a fingerprint by executing any number of algorithms on the captured frame. The method of FIG. 2 may be one example of such a fingerprinting algorithm, which may be repeated on a sequence of frames to generate a fingerprinter for each frame in the sequence.

Figure 4A:
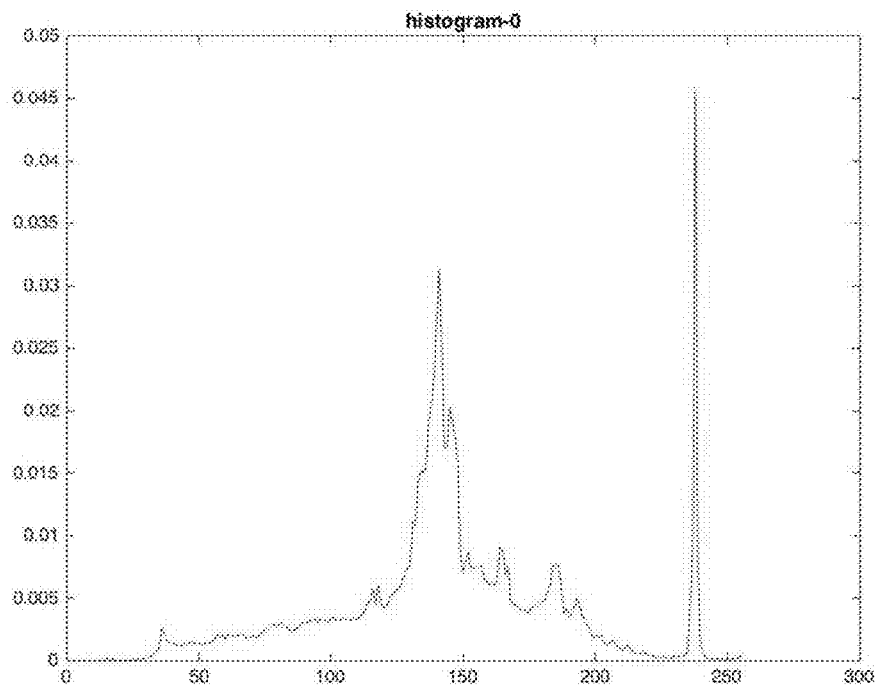
FIG. 4A is a histogram of the video frame of FIG. 3.

With further reference to FIG. 2, the fingerprinter 122 can generate a one-dimensional (1-D) histogram function of pixel values from the frame of the captured video (210). FIG. 4A is an example of a histogram function, generated from the video frame of FIG. 3. In one embodiment, the histogram function includes an x axis (which, for example, ranges from 0 to 255) representing specific pixel values and a y axis representing a number of pixels at each respective specific pixel value, for that frame. While the range of the x axis may be referred to as 0 to 255 in the present disclosure, this is by no way limiting and is exemplary. In one embodiment, the pixel value may be taken from a Y value of YUV space of the frame.

Figure 4B:
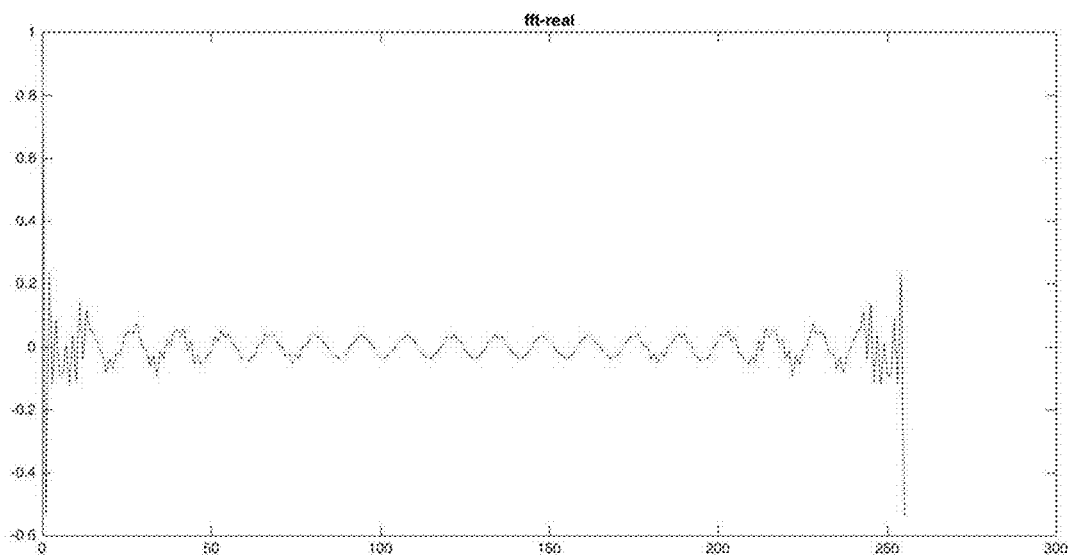
FIG. 4B illustrates a real portion of results from transforming the histogram of FIG. 4A with a Fast Fourier Transform.

The fingerprinter 122 can next transform the histogram with a Fast Fourier Transform (FFT) (220). The output of the FFT can be a sequence of a certain number (e.g., 256 in the present example) of complex values with indices 0, 1, . . . . 255 (230). Each complex value includes a real part and an imaginary part. FIG. 4B is an example of a real portion of the results of taking the FFT of the histogram of FIG. 4A. For each complex value index from 0 to 255, the fingerprinter 122 can determine whether the real part of the complex value is greater than zero ("0") (240). When the real part is greater than zero, the fingerprinter 122 can output a binary bit of one ("1") (250). When the real part is less than or equal to zero, the fingerprinter 122 can output a binary bit of zero ("0") (250). The fingerprinter 122 can then concatenate a specific number of these output bits (e.g., the first 128 bits, all 256 bits or every other bit) (270), to generate the fingerprint for the frame (275).

With further reference to FIG. 1A, when the fingerprinter 122 has fingerprinted the content frames 120, the fingerprinter can send fingerprints (including channel information, time codes, and fingerprint information) to the ACR cloud(s) 110. In one example, the different ACR fingerprinting algorithms can be used on the same content frames 120 to provide different fingerprinter information to ACR cloud(s) 110 of different ACR vendors. Different ACR fingerprinting formats can be used by different media consumption devices manufactured by different contract equipment manufacturers (CEMs). An advantage of the fingerprinter 122 including ACR fingerprinting algorithms for different ACR vendors can be to enable content to be fingerprinted and provided to viewers via different media consumption devices regardless of the manufacturer of the media consumption device. An advantage of fingerprinting the same content frames 120 with the different ACR fingerprinting algorithms can be to provide contextually-relevant advertisements and interactive content to viewers with media consumption devices using different ACR fingerprinting. In another example, the content frames 120 can include media content from different content feeds. In this example, the different ACR fingerprinting algorithms can be used on the content frames 120 of the different content feeds to provide different fingerprinting information to ACR cloud(s) 110 of different ACR vendors.

The different fingerprinting information can be uploaded to ACR cloud(s) 110 of the different ACR vendors, respectively. In one example, the ACR cloud(s) 110 can use the ACR fingerprinting information for digital advertisement replacement (DAR). In another example, the ACR fingerprinting information can be used for advertisement or content augmentation and data collection. The ACR cloud(s) 110 can use the fingerprinting information to match the encoded content with contextually-relevant advertisements and interactive content. The matched encoded content and contextually-relevant advertisements and interactive content can then be provided to the media consumption devices for display. In another example, information about the matching events can be communicated to the broadcast cloud(s) 112 for analysis of content matching.

In one example, ACR fingerprinting information can be delivered to the ACR cloud(s) 110 before broadcast schedule metadata can be communicated from the broadcast cloud(s) 112 to the ACR cloud(s) 110. In another example, the broadcast schedule metadata can be uploaded to the ACR cloud(s) 110 when an entire segment has been encoded and received at the broadcast cloud(s) 112. In another example, content can be continuously fingerprinted and resultant fingerprinting information can be continuously communicated or communicated at select rates to ACR vendor clouds. The selected rates can be based on the different ACR vendors. For example, one vendor can deliver ACR fingerprinting information several times per second, whereas another vendor can deliver this information once every 2-5 seconds.

In one example, the content device 102 can encode, encrypt, and upload content to the broadcast cloud(s) 112. In another example, the content device 102 can receive broadcaster-specific schedule metadata from a broadcaster (data about what shows and ads are in the content feed received at the capture interface 106). The metadata can be communicated by the content device 102 to the broadcast cloud(s) 112. In another example, the broadcast cloud(s) 112 can communicate metadata (such as broadcaster-specific schedule metadata) to the ACR cloud(s) 110 or to different ACR cloud(s) 110 of different vendors so that vendors can use the metadata to match up to the fingerprint information received from the fingerprinter 122.

In one example, the content device 102 can use a first communication channel to communicate with the broadcast server 112 and use a second communication channel to communicate with an ACR cloud 110. For example, the uploader 118 of the content device 102 can communicate or upload encoded content to a broadcast server using the first communication channel. In this example, the fingerprinter 122 can communicate ACR fingerprinting information to the ACR cloud 110 using the second communication channel. The first and second communication channels can be wired or wireless communication channels, such as Wi-Fi communication channels or cellular communication channels.

In one example, where the capturer 114 splits the audio/video data for delivery to the fingerprinter 122 and the segment encoder 116. In another example, the content device 102 encodes and uploads the media content using the segment encoder 116 and uploader 118 and ACR fingerprints the media content using the fingerprinter 122 at the same time or over a threshold period of time. In another example, the content device 102 encodes and uploads the media content using the segment encoder 116 and uploader 118 in parallel with ACR fingerprinting the media content using the fingerprinter 122.

In one example, the capture interface 106 receives the media content from the content feed 124 and delivers the media content to the capturer 114. The capturer 114 can split the media content into multiple threads or processes that can be processed by the segment encoder 116 and the fingerprinter 122 simultaneously or in parallel. In this example, a first thread or process can be encoded by the segment encoder 116 and uploaded by the uploader 118. In one embodiment, a second thread or process can be fingerprinted by the fingerprinter 122 simultaneously or in parallel with the encoding. In another embodiment, the capturer 114 can deliver one or more threads or processes to different external fingerprinters for fingerprinting.

The content device 102 can be a centralized device that can encode and fingerprint media content in parallel to provide media content with contextually-relevant content to the media consumption device. An advantage of encoding and fingerprinting the media content simultaneously or in parallel at the content device 102 is to minimize an amount of infrastructure, overhead, and monitoring used. Another advantage of the content device 102 encoding, uploading, and fingerprinting content can be to provide fault tolerant content streaming with ACR fingerprinting. For example, when the fingerprinter 122 fails, content streaming can continue without interruption and the ACR fingerprinting can be restarted. In one example, the fault tolerant content preparation system 100 can perform ACR fingerprinting as a separate process from content encoding and uploading to avoid faults in providing streaming content for viewing.

In one example, the fingerprinter 122 can perform ACR fingerprinting upstream of broadcast distribution in the content preparation system 100. In another example, the ACR fingerprinting can occur in the broadcast chain where broadcast feeds can be delivered for encoding and uploading. An advantage of performing ACR fingerprinting where the broadcast feeds can be delivered for encoding and uploading can be to enable the content preparation system 100 to combine the ACR fingerprinting, encoding, and uploading into a single device. Another advantage of performing ACR fingerprinting where the broadcast feeds can be delivered for encoding and uploading can be to utilize a single broadcast feed to perform ACR fingerprinting, encoding, and uploading. When a single broadcast feed is used, a number of devices and/or applications to be purchased, installed, monitored, and maintained for ACR fingerprinting, encoding, and uploading of content by an enterprise can be reduced. For example, capital expenses (CAPEX) and/or operational expenses (OPEX) of the enterprise can be reduced, such as a reduced system infrastructure (rack space, power, and Ethernet connectivity). Additionally, when a single broadcast feed is used, a number of broadcast feeds generated from a broadcaster's distribution amplifier can be reduced.

Figure 1B:
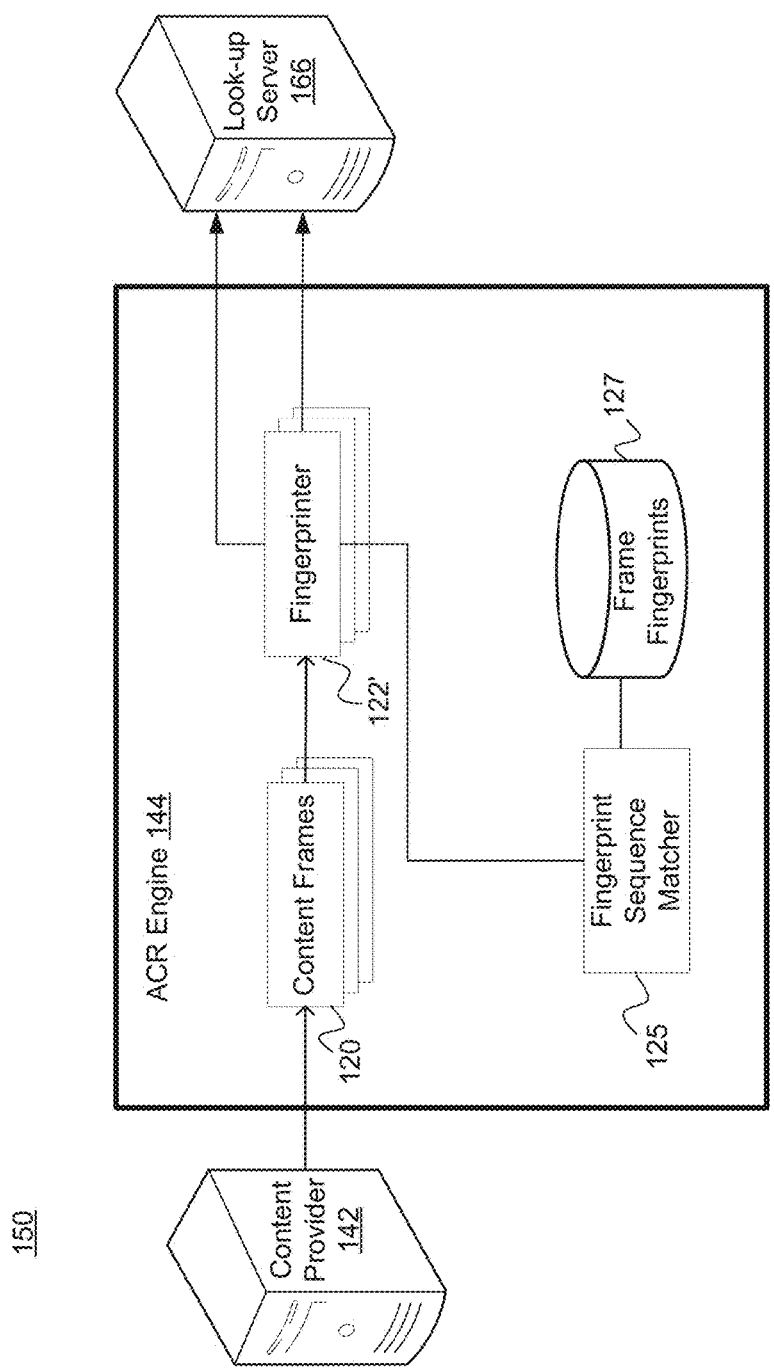
FIG. 1B illustrates a content manager for matching fingerprints with those obtained from a broadcast video stream being sent to a media consumption device.

FIG. 1B illustrates a content manager 150 for matching fingerprints with those obtained from a broadcast video stream being sent to a media consumption device. The content manager 150 can include an ACR engine 144 that receives content frames of the media content to be fingerprinted, a fingerprinter 122', a fingerprint sequence matcher 125 and a database 127 in which are stored frame fingerprints, according to one embodiment. A content provider 142 can generate multimedia content that is streamed to media consumption devices and to the content devices 102 of FIG. 1A, which can be used to generate initial fingerprints to be stored in the database 127 for later comparison.

The fingerprinter 122' can detect or select a number of content frames 120 from the multimedia content as a fingerprint. In one embodiment, the number of content frames 120 can be sequentially ordered, and thus include sequential time stamps from a beginning to an end of the fingerprint. In one example, the content can be audio data, video data, or both. In this example, video content can be raw video frames.

For example, when the fingerprinter 122' receives the content frames 120, the fingerprinter 122' can determine how to process the content frames 120, such as the raw video and/or audio frames to generate the fingerprint according to various embodiment of the present disclosure. In one example, the frames can be fingerprinted individually. In another example, the frames can be fingerprinted in collections or sequences. The fingerprinter 122' can determine when to fingerprint the frames individually or sequentially based on an ACR algorithm that the fingerprinter 122' executes during fingerprinting, such as those disclosed herein, for example.

In another example, the fingerprinter 122' can fingerprint the content frames 120 differently for different broadcasters or users. In this example, the fingerprinter 122' can include different ACR fingerprinting algorithms for different ACR vendors. In one example, the different ACR fingerprinting algorithms can be predetermined and stored in memory of the fingerprinter.

In yet another example, the different ACR fingerprinting algorithms can be provided by third party ACR vendors. When the different ACR fingerprinting algorithms are provided by such vendors, the fingerprinter 122' can aggregate the different ACR fingerprinting algorithms. In one example, ACR fingerprinting can use raw video with in the YUV 4:2:2 colorspace and at high resolutions or other levels of resolution. When video content is received at a local provider or other content provider 142, the fingerprinter 122' can convert the video content to YUV 4:2:0 colorspace and scale it down in resolution to a threshold resolution level for encoding by a broadcaster or distributor before being sent to media consumption devices.

In some embodiments, the fingerprinter 122' can include, or can communicate with, the fingerprint sequence matcher 125. The fingerprint sequence matcher 125 can match a sequence of fingerprints to an original video content from which a given set of individual frame fingerprints originated.

When the fingerprinter 122' has fingerprinted the content frames 120, the fingerprinter can send fingerprints (including channel information, time codes, and fingerprint information) to a look-up server 166. The look-up server 166 can also be in communication (or coupled) with an overlay decision engine and an ad targeter, to send overlay and subject matter matching information to the overlay decision engine and the ad targeter with which to contextually target users on the media consumption device.

In another embodiment, the fingerprinter 122' can execute the fingerprinting algorithm of FIG. 2 to generate the same fingerprint as generated by the fingerprinter 122 of the content device 102. In this way, streaming video content to the content device 102 can also be streamed to the content manager 150, and verified within the ACR engine 144 to be a match. By verifying the two streaming videos as matches, the content manager 150 can work within a larger targeting system to send targeting content (such as advertising or informational content) to a media consumption device during commercial breaks and the like.

In one example, the different ACR fingerprinting algorithms can be used on the same content to provide different fingerprint information to look-up servers of different ACR vendors. An advantage of fingerprinting the same content (e.g., content frames) 120 differently can be to provide contextually-relevant advertisements and interactive content to different viewers of media consumption devices. In another example, the content frames 120 can include media content from different feeds. In this example, the different ACR fingerprinting algorithms can be used on the content of the different feeds of the content frames 120 to provide different fingerprinting information to the look-up servers of different ACR vendors.

As discussed, the fingerprinter 122' can generate individual fingerprints from multimedia content, such as can pass through a broadcasting server, a headend, a switch, and/or a set-top box, in route to being displayed on a media consumption device of a user. The fingerprints can be associated with one frame or a number of frames. The frames can be taken in a sequential order with chronological time stamps, or can be taken at some interval such as every other (or every third frame), for example, still with corresponding time stamps.

The fingerprint sequence matcher 125 can process a set or sequence of these individual frames (as a query fingerprint) to match the frames to frame fingerprints (stored in the database 127) of original video content from which the corresponding video frames represented by these fingerprints originated. The frame fingerprints can be single frames and each include a corresponding time slot (or some kind of index such as a frame number or an amount of time from the beginning of the media program). Finding a match can result in determining the media program the user is watching on the media consumption device, a channel, a time slot of a schedule in terms of beginning and ending times of the program, commercial time slots, and such information of the matching media program.

To have confidence in the matching results, the fingerprint sequence matcher 125 can take advantage of the fact that the sequence of the fingerprint is ordered in time, and so the matching fingerprints not only belong to the same video, but are similarly ordered in time. The fingerprint sequence matcher 125 can exploit this property to map time stamps of the frames of a query fingerprint to frame fingerprints of the original content used for matching (e.g., in a two-dimensional data structure), and to filter out outliers by, for example, executing a pattern recognition algorithm on the mapped time stamp points.

The fingerprint sequence matcher 125 can also use such temporal properties of sequences of frames in a fingerprint to detect how a matching fingerprint sequence was played out (faster, slower, or in reverse). An algorithm in the ACR fingerprint sequence matcher 125 can be implemented to detect certain playback scenarios, such as, for example, normal speed at full frame rate, normal speed at ½ frame rate, normal speed at ⅓ frame rate, or the like.

Figure 5:
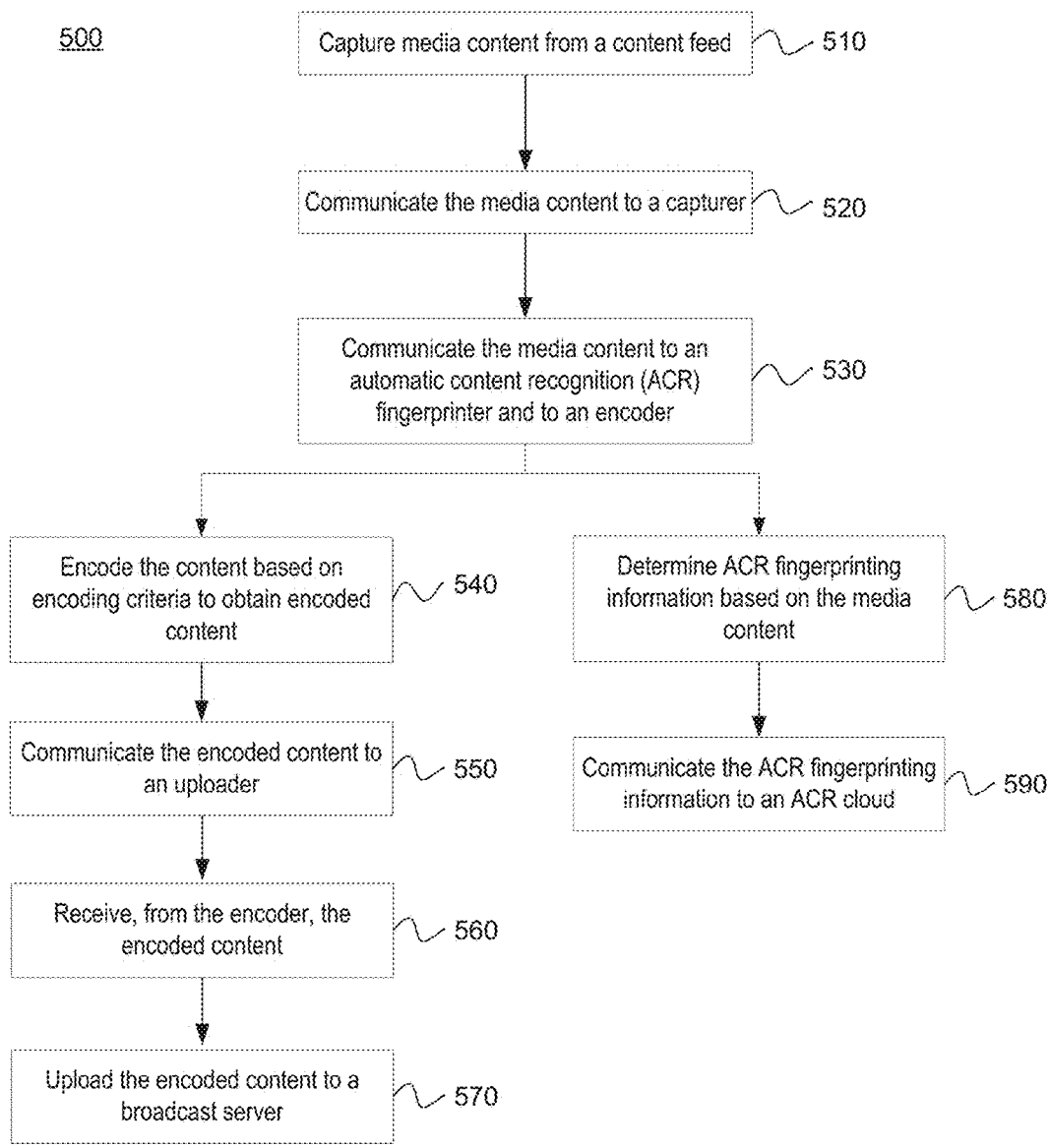
FIG. 5 illustrates a flowchart of a client device for encoding and automatic content recognition (ACR) fingerprinting according to one embodiment.

FIG. 5 illustrates a method 500 of the content device 102 (illustrated in FIG. 1A) for encoding and automatic content recognition (ACR) fingerprinting according to one embodiment. The method 500 can be at least partially performed by processing logic of the content device 102 that can include hardware (e.g., circuitry, dedicated logic, programmable logic, microcode, etc.), software (e.g., instructions executed by a processing device), firmware or a combination thereof. The processing logic of the content device 102 can include the capture interface 106, the capturer 114, the segment encoder 116, the uploader 118, and one or more fingerprinter 122.

Referring to FIG. 5, the method 500 begins with capturing media content, by capture interface 106, from the content feed 124 (510). The method can also include communicating, by the capture interface 106, the media content to the capturer 114 (520). The method can include, communicating, by the capturer 114, the media content to the fingerprinter 122 and to the segment encoder 116 (530).

The method can also include encoding, by the segment encoder 116, the content based on encoding criteria to obtain encoded content (540). In one example, the encoding criteria can include: a security encryption format; display size adjustment information; network processing capabilities information; network communication condition information; or battery capabilities of a media consumption device. In one example, the battery capabilities of a media consumption device can be predetermined and stored at the content device. In this example, the content device can encode the media content based on the battery capabilities to reduce battery drain using lower resolution media content for battery capacity limited media consumption devices or increase the resolution of the media content when the battery capacity of the media consumption device is relatively large. The method can also include sending, by the segment encoder 116, the encoded content to the uploader 118 (550). The method can also include receiving, from the segment encoder 116, the encoded content at the uploader 118 (560). The method can also include uploading, by the uploader 118, the encoded content to the broadcast server or cloud 112 (570).

The method can also include determining, by the fingerprinter 122, the ACR fingerprinting information based on the media content (580). The method can also include communicating, by the fingerprinter 122, the ACR fingerprinting information to the ACR cloud 110 (590). In one example, the encoding the media content (540-570) and ACR fingerprinting of the media content (580-590) are done at the same time or in parallel. In another example, the encoding the media content (540-570) and ACR fingerprinting of the media content (580-590) are done independent of each other.

Figure 6:
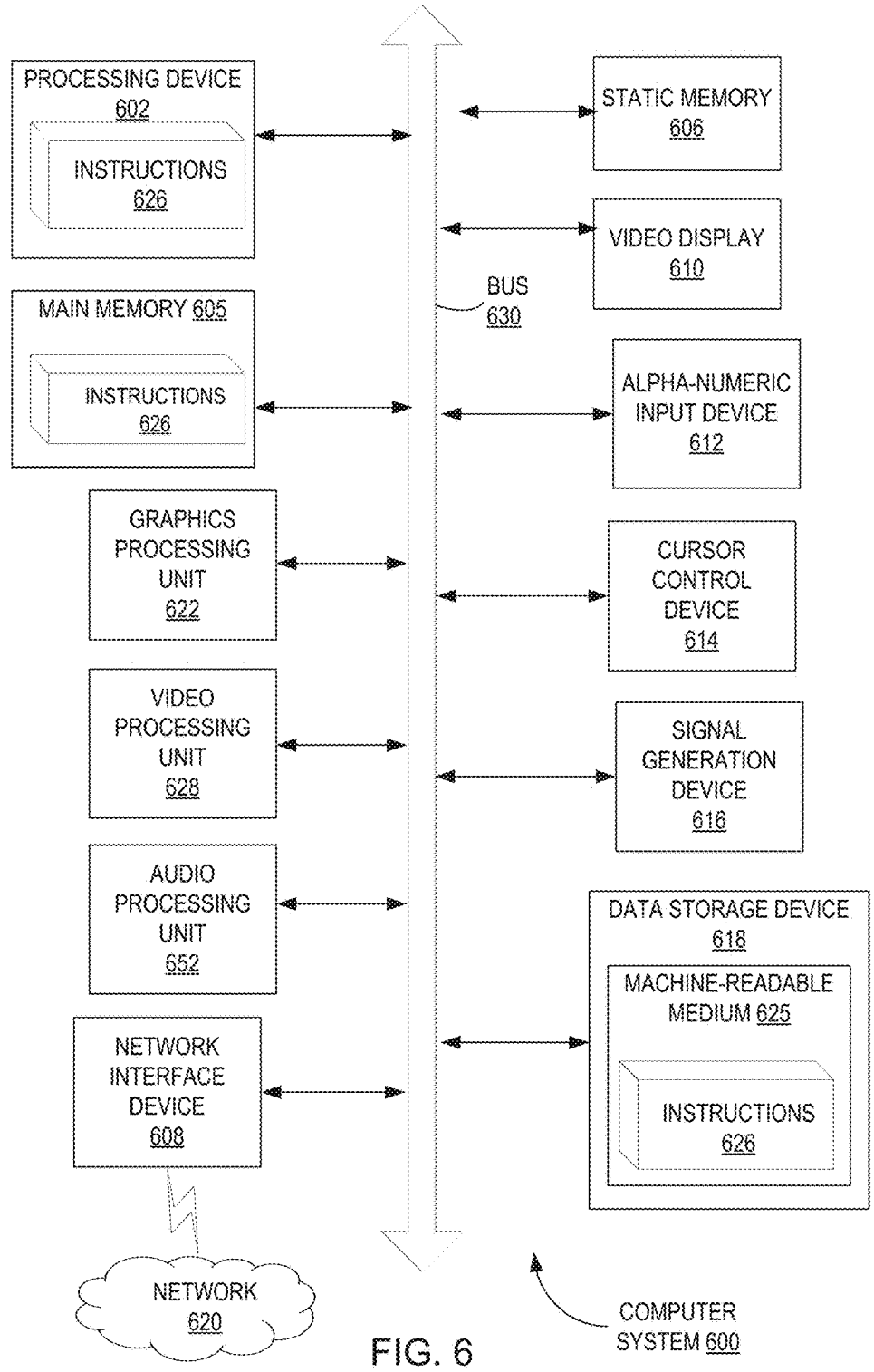
FIG. 6 schematically illustrates a block diagram of a system according to one embodiment.

FIG. 6 schematically illustrates a block diagram of a computer system 600 according to one embodiment. In one embodiment, the machine can be connected (e.g., networked) to other machines in a LAN, an intranet, an extranet, or the Internet. The machine can operate in the capacity of a server or a client device in a client-server network environment, or as a peer machine in a peer-to-peer (or distributed) network environment. The machine can be a personal computer (PC), a tablet PC, a set-top box (STB), a Personal Digital Assistant (PDA), a cellular telephone, a smartphone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 600 can correspond to the content preparation system 100 of FIG. 1A or the content manager 150 of FIG. 1B. The computer system 600 can correspond to the content device 102 of FIG. 1A or the ACR engine 144 of FIG. 1B. The computer system 600 can correspond to at least a portion of the content device 102, such as the capture daemon 104 or the capture interface 106.

The computer system 600 includes a processing device 602, a main memory 604 (e.g., read-only memory (ROM), flash memory, dynamic random access memory (DRAM) (such as synchronous DRAM (SDRAM) or DRAM (RDRAM), etc.), a static memory 606 (e.g., flash memory, static random access memory (SRAM), etc.), and a data storage device 618, which communicate with each other via a bus 630.

The processing device 602 represents one or more general-purpose processing devices such as a microprocessor, central processing unit, or the like. More particularly, the processing device can be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device 602 can also be one or more special-purpose processing devices such as an application specific integrated circuit (ASIC), a field programmable gate array (FPGA), a digital signal processor (DSP), network processor, or the like. In one embodiment, processing device 602 can include one or more processing cores. The processing device 602 is configured to execute the instructions 626 of a mirroring logic for performing the operations discussed herein.

The computer system 600 can further include a network interface device 608 communicably coupled to a network 620. The computer system 600 also can include a video display unit 610 (e.g., a liquid crystal display (LCD) or a cathode ray tube (CRT)), an alphanumeric input device 612 (e.g., a keyboard), a cursor control device 614 (e.g., a mouse), a signal generation device 616 (e.g., a speaker), or other peripheral devices. Furthermore, computer system 600 can include a graphics processing unit 622, a video processing unit 628, and an audio processing unit 632. In another embodiment, the computer system 600 can include a chipset (not illustrated), which refers to a group of integrated circuits, or chips, that are designed to work with the processing device 602 and controls communications between the processing device 602 and external devices. For example, the chipset can be a set of chips on a motherboard that links the processing device 602 to very high-speed devices, such as main memory 604 and graphic controllers, as well as linking the processing device 602 to lower-speed peripheral buses of peripherals, such as USB, PCI or ISA buses.

The data storage device 618 can include a computer-readable storage medium 624 on which is stored instructions 626 embodying any one or more of the methodologies of functions described herein. The instructions 626 can also reside, completely or at least partially, within the main memory 604 and/or within the processing device 602 during execution thereof by the computer system 600; the main memory 604 and the processing device 602 also constituting computer-readable storage media.

The computer-readable storage medium 624 can also be used to store instructions 626 utilizing logic and/or a software library containing methods that call the above applications. While the computer-readable storage medium 624 is shown in an example embodiment to be a single medium, the term "computer-readable storage medium" or "computer-readable medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

In the above description, numerous details are set forth. It will be apparent, however, to one of ordinary skill in the art having the benefit of this disclosure, that embodiments can be practiced without these specific details. In some instances, well-known structures and devices are shown in block diagram form, rather than in detail, in order to avoid obscuring the description.

Although the embodiments can be herein described with reference to specific integrated circuits, such as in computing platforms or microprocessors, other embodiments are applicable to other types of integrated circuits and logic devices. Similar techniques and teachings of embodiments described herein can be applied to other types of circuits or semiconductor devices. For example, the disclosed embodiments are not limited to desktop computer systems or Ultrabooks™ and can be also used in other devices, such as handheld devices, tablets, other thin notebooks, systems on a chip (SOC) devices, and embedded applications. Some examples of handheld devices include cellular phones, Internet protocol devices, smartphones, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below.

Although the embodiments are herein described with reference to a processor or processing device, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, and/or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware, or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting," "initiating," "determining," "continuing," "halting," "receiving," "recording," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and can not necessarily have an ordinal meaning according to their numerical designation.

Embodiments described herein can also relate to an apparatus for performing the operations herein. This apparatus can be specially constructed for the required purposes, or it can comprise a general-purpose computer selectively activated or reconfigured by a computer program stored in the computer. Such a computer program can be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems can be used with programs in accordance with the teachings herein, or it can prove convenient to construct a more specialized apparatus to perform the operations. The required structure for a variety of these systems will appear from the description below. In addition, the present embodiments are not described with reference to any particular programming language. It will be appreciated that a variety of programming languages can be used to implement the teachings of the embodiments as described herein.

The above description sets forth numerous specific details such as examples of specific systems, components, methods and so forth, in order to provide a good understanding of several embodiments. It will be apparent to one skilled in the art, however, that at least some embodiments can be practiced without these specific details. In other instances, well-known components or methods are not described in detail or are presented in simple block diagram format in order to avoid unnecessarily obscuring the present embodiments. Thus, the specific details set forth above are merely exemplary. Particular implementations can vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:
1. A content device comprising:
a non-transitory memory storing instructions;
a capture interface including a port configured to receive streaming video content from a content provider; and
a processing device operatively coupled to the non-transitory memory and the capture interface and con- figured to execute the instructions, the executed instructions causing the processing device to perform operations comprising:
  splitting the streaming video content into a first thread and a second thread;
  encoding the first thread of the streaming video content into encoded video content;
  sending the encoded video content from the processing device to a broadcast server, the broadcast server in response to receiving the encoded video content, delivering the encoded video content to a media consumption device;
  capturing frames of the second thread of the streaming video content; and
  for each captured frame of the second thread of the streaming video content, fingerprinting the corresponding captured frame simultaneously or in parallel with the encoding of the first thread of the streaming video content by:
    generating a one-dimensional histogram function of pixel values;
    transforming the histogram function with a Fast Fourier Transform (FFT) to generate a plurality of complex values for the corresponding captured frame;
    for each of the plurality of complex values, generating a plurality of bits by assigning a binary one ("1") when a real part of the complex value is greater than zero ("0") and assigning a binary zero ("0") when the real part is less than or equal to zero; and
    concatenating a specific number of the plurality of bits to generate a fingerprint for the corresponding captured frame; and
    sending the fingerprint for the corresponding captured frame to an automatic content recognition (ACR) server, the ACR server in response to receiving the fingerprint, storing the fingerprint in a fingerprint database.

2. The content device of claim 1, wherein the histogram function includes an x axis representing specific pixel values and a y axis representing a number of pixels at each respective specific pixel value.

3. The content device of claim 2, wherein each specific pixel value of the histogram function comprises a corresponding Y value of a YUV color space.

4. The content device of claim 1, wherein the operations further comprise, when fingerprinting the corresponding captured frame, indexing the plurality of complex values from zero ("0") to 255.

5. The content device of claim 1, wherein the generated fingerprint is 128 bits long or 256 bits long.

6. The content device of claim 1, wherein the ACR server, in response to receiving the fingerprint, is further configured to store the fingerprint in relation to corresponding broadcast schedule metadata.

7. A method comprising:
  receiving, at a processing device of a content device, streaming video content from a content provider via a capturer interface, the capturer interface operatively coupled to the processing device;
  splitting, by the processing device, the streaming video content into a first thread and a second thread;
  encoding, by the processing device, the first thread of the streaming video content into encoded video content;
  sending the encoded video content from the processing device to a broadcast server, the broadcast server in response to receiving the encoded video content, delivering the encoded video content to a media consumption device;
  capturing, by the processing device, frames of the second thread of the streaming video content; and
  for each captured frame of the second thread of the streaming video content, fingerprinting, by the processing device, the corresponding captured frame simultaneously or in parallel with the encoding of the first thread of the streaming video content by:
    generating a one-dimensional histogram function of pixel values;
    transforming the histogram function with a Fast Fourier Transform (FFT) to generate a plurality of complex values for the corresponding captured frame;
    for each of the plurality of complex values, generating a plurality of bits by assigning a binary one ("1") when a real part of the complex value is greater than zero ("0") and assigning a binary zero ("0") when the real part is less than or equal to zero;
    concatenating a specific number of the plurality of bits to generate a fingerprint for the corresponding captured frame; and
    sending the fingerprint for the corresponding captured frame to an automatic content recognition (ACR) server, the ACR server in response to receiving the fingerprint, storing the fingerprint in a fingerprint database.

8. The method of claim 7, wherein the histogram function includes an x axis representing specific pixel values and a y axis representing a number of pixels at each respective specific pixel value.

9. The method of claim 8, wherein each specific value of the histogram function comprises a corresponding Y value of a YUV color space.

10. The method of claim 7, further comprising, when fingerprinting the corresponding captured frame, indexing, by the processor device, the plurality of complex values from zero ("0") to 255.

11. The method of claim 7, wherein the generated fingerprint is 128 bits long or 256 bits long.

12. The method of claim 7, ACR server in response to receiving the fingerprint, is further configured to store the fingerprint in relation to corresponding broadcast schedule metadata.

13. A non-transitory machine-readable storage medium storing instructions that, when executed by a processing device, cause the processing device to perform operations comprising:
  receiving streaming video content from a content provider via a capturer interface, the capturer interface operatively coupled to the processing device;
  splitting the streaming video content into a first thread and a second thread;
  encoding the first thread of the streaming video content into encoded video content;
  sending the encoded video content from the processing device to a broadcast server, the broadcast server in response to receiving the encoded video content, delivering the encoded video content to a media consumption device;
  capturing frames of the second thread of the streaming video content; and
  for each captured frame of the second thread of the streaming video content, fingerprinting the corresponding captured frame simultaneously or in parallel with the encoding of the first thread of the streaming video content by:
generating a one-dimensional histogram function of pixel values;
transforming the histogram function with a Fast Fourier Transform (FFT)) to generate a plurality of complex values for the corresponding captured frame;
for each of the plurality of complex values, generating a plurality of bits by assigning a binary one ("1") when a real part of the complex value is greater than zero ("0") and assigning a binary zero ("0") when the real part is less than or equal to zero;
concatenating a specific number of the plurality of bits to generate a fingerprint for the corresponding captured frame; and
sending the fingerprint for the corresponding captured frame to an automatic content recognition (ACR) server, the ACR server in response to receiving the fingerprint, storing the fingerprint in a fingerprint database.

14. The non-transitory machine-readable storage medium of claim 13, wherein the histogram function includes an x axis representing specific pixel values and a y axis representing a number of pixels at each respective specific pixel value.

15. The non-transitory machine-readable storage medium of claim 14,
wherein each specific pixel value of the histogram function comprises a corresponding Y value of a YUV color space.

16. The non-transitory machine-readable storage medium of claim 13, wherein the operations further comprise, when fingerprinting the corresponding captured frame, indexing the plurality of complex values from zero ("0") to 255.

17. The non-transitory machine-readable storage medium of claim 13, wherein the generated fingerprint is 128 bits long or 256 bits long.

* * * * *